United States Patent
Chujo et al.

(10) Patent No.: US 9,715,627 B2
(45) Date of Patent: Jul. 25, 2017

(54) AREA INFORMATION ESTIMATING DEVICE, AREA INFORMATION ESTIMATING METHOD, AND AIR CONDITIONING APPARATUS

(71) Applicant: OMRON Corporation, Kyoto (JP)

(72) Inventors: Hideki Chujo, Kyoto (JP); Seriya Iguchi, Kyoto (JP); Seiichi Manabe, Shiga (JP); Hiromatsu Aoki, Osaka (JP); Shun Sakai, Shiga (JP)

(73) Assignee: OMRON Corporation, Kyoto (JP)

( * ) Notice: Subject to any disclaimer, the term of this patent is extended or adjusted under 35 U.S.C. 154(b) by 0 days.

(21) Appl. No.: 14/865,114

(22) Filed: Sep. 25, 2015

(65) Prior Publication Data

US 2016/0110602 A1    Apr. 21, 2016

(30) Foreign Application Priority Data

Oct. 17, 2014   (JP) .................. 2014-213240

(51) Int. Cl.
*G06K 9/00* (2006.01)
*F24F 11/00* (2006.01)
(Continued)

(52) U.S. Cl.
CPC ........ *G06K 9/00624* (2013.01); *F24F 11/006* (2013.01); *G05B 13/021* (2013.01);
(Continued)

(58) Field of Classification Search
CPC ........... G06K 9/00711; G06K 9/00771; G06K 9/00362; G06K 9/00369; G06K 9/32;
(Continued)

(56) References Cited

U.S. PATENT DOCUMENTS 7,755,480 B2 * 7/2010 Aritsuka ............... G06F 21/554
                                              340/286.02
9,445,164 B2 * 9/2016 Imahara ................ F24F 11/006
(Continued)

FOREIGN PATENT DOCUMENTS

EP     2 966 503 A1    1/2016
JP     2002197463 A    7/2002
(Continued)

OTHER PUBLICATIONS

Partial European Search Report issued in corresponding European Application No. 15185277.9, mailed Apr. 14, 2016 (8 pages).
(Continued)

*Primary Examiner* — Vu Le
*Assistant Examiner* — Aklilu Woldemariam
(74) *Attorney, Agent, or Firm* — Osha Liang LLP

(57) ABSTRACT

An area information estimating device has a camera that photographs an image within a sensing area, a person detector that detects a person from the image from the camera, and a position calculator that calculates an existence position of the person in the sensing area based on a coordinate on the image in which the person is detected by the person detector. The person detector excludes the person in whom a relationship between the coordinate and a size on the image does not satisfy a predetermined condition from a detection target.

10 Claims, 14 Drawing Sheets

(51) Int. Cl.
*G05B 13/02* (2006.01)
*G06T 7/70* (2017.01)

(52) U.S. Cl.
CPC ..... *G06K 9/00369* (2013.01); *G06K 9/00778* (2013.01); *G06T 7/70* (2017.01); *G06K 9/00* (2013.01); *G06T 2207/10004* (2013.01); *G06T 2207/30196* (2013.01)

(58) Field of Classification Search
CPC .......... G06K 9/00302; G06K 9/00335; G06K 2209/15; G06K 9/00624; G06K 9/628; G06K 9/00778; G06K 9/00677; G06K 9/00812; G06K 9/00201; G06K 9/00315; G06K 9/6234; G06K 9/6262; G06K 9/627; G06K 2209/27; H04N 5/262; H04N 5/23219; H04N 5/772; H04N 5/23222; H04N 5/23238; H04N 5/23296; H04N 21/218; H04N 5/2259; G06T 2207/30196; G06T 7/0046; G06T 7/20; G06T 1/0007; G06T 2207/30232; G06T 7/2006; G06T 7/0081; G06T 7/2093; G06T 5/006; G06T 2207/30201; G06T 2207/10012; G06T 7/11; G06T 7/74; G01S 5/0294; G01S 5/12; B60R 21/01534; B60R 21/01538; G08B 13/19608; G08B 13/19602; G08B 13/19628; G08G 1/147; G02B 13/06; G02B 26/0883; G02B 7/1805; G03B 37/00
USPC ....... 382/103, 111, 124, 153, 190, 100, 106, 382/107, 155
See application file for complete search history.

(56) References Cited

U.S. PATENT DOCUMENTS

| | | | | |
|---|---|---|---|---|
| 2003/0048926 | A1* | 3/2003 | Watanabe | G06K 9/00362 382/103 |
| 2008/0193009 | A1* | 8/2008 | Sonoura | G01S 5/0294 382/153 |
| 2010/0033579 | A1* | 2/2010 | Yokohata | G03B 15/00 348/169 |
| 2011/0052076 | A1* | 3/2011 | Yashiro | G06K 9/00362 382/190 |
| 2012/0020518 | A1* | 1/2012 | Taguchi | G06T 7/292 382/103 |
| 2012/0201468 | A1* | 8/2012 | Oami | G06K 9/00362 382/199 |
| 2013/0170760 | A1 | 7/2013 | Wang et al. | |
| 2013/0230245 | A1* | 9/2013 | Matsumoto | G06K 9/00369 382/173 |
| 2013/0251203 | A1* | 9/2013 | Tanabiki | G06K 9/00369 382/103 |
| 2013/0329958 | A1* | 12/2013 | Oami | G06T 7/20 382/103 |
| 2014/0163424 | A1* | 6/2014 | Kawaguchi | A61B 5/0077 600/595 |
| 2015/0362706 | A1 | 12/2015 | Chujo et al. | |

FOREIGN PATENT DOCUMENTS

JP 2013024534 A 2/2013
JP 2013037406 A 2/2013

OTHER PUBLICATIONS

Calderara, Simone et al.; "HECOL: Homography and Epipolar-based Consistent Labeling for Outdoor Park Surveillance, Accepted Manuscript"; Computer Vision and Image Understanding; Jul. 7, 2007; pp. 1-41 (42 pages).

Haritaoglu, I et al.; "W4: Real-Time Surveillance of People and Their Activities"; IEEE Transactions on Pattern Analysis and Machine Intelligence; IEEE Computer Society; USA; vol. 22, No. 8; Aug. 1, 2000; pp. 809-830 (22 pages).

Extended European Search Report in counterpart European Application No. 15 18 5277.9 issued Jul. 13, 2016 (15 pages).

Qing Ye at al; "A method of automatic people counting used in air-conditioning energy-saving"; Computer Engineering and Technology; 2010 2nd International Conference on IEEE; XP031690173; Piscataway, NJ, USA; Apr. 16, 2010; pp. V6-703-V6-708 (6 pages).

* cited by examiner

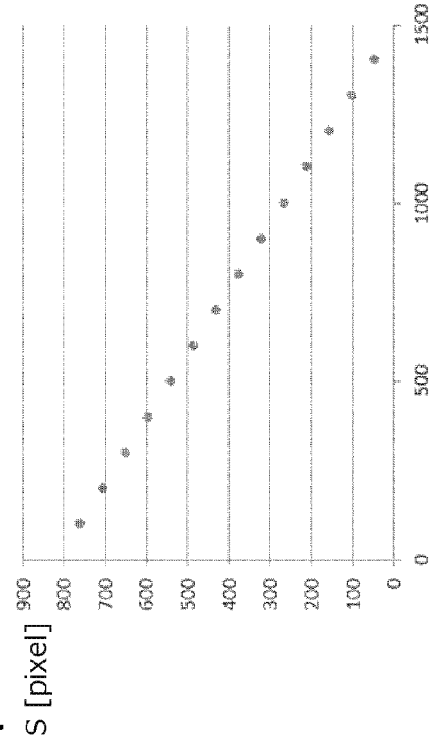
*FIG. 8A*
*FIG. 8C*
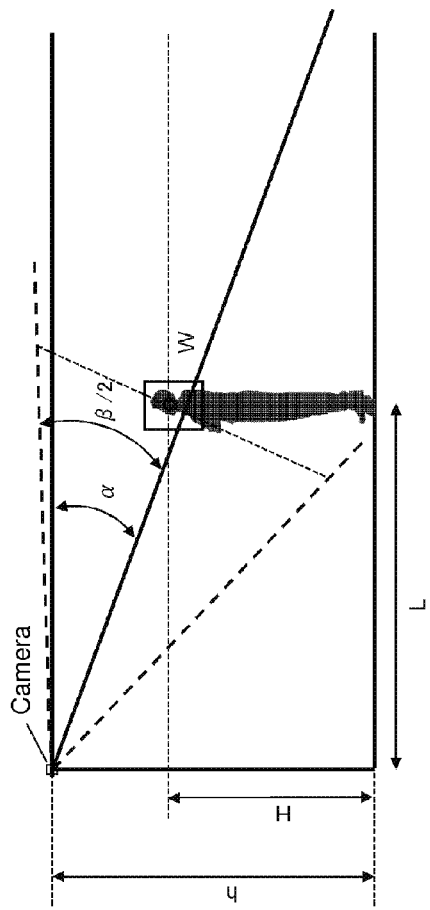
*FIG. 8B*

AREA INFORMATION ESTIMATING DEVICE, AREA INFORMATION ESTIMATING METHOD, AND AIR CONDITIONING APPARATUS

CROSS-REFERENCE TO RELATED APPLICATION

This application is based on Japanese Patent Application No. 2014-213240 filed with the Japan Patent Office on Oct. 17, 2014, the entire contents of which are incorporated herein by reference.

BACKGROUND

Field

The present invention relates to a technology for estimating information on a sensing area from an image of a camera.

Related Art

Nowadays, there is increasing a need for estimating a person's flow line, a floor surface, and a shape of a room or a passage based on a result of detecting the person from the image photographed with the camera. This kind of technology is applied to structure recognition of a sensing area in a monitoring camera or an image sensor, or has been incorporated in a household electrical appliance.

For example, in a technology disclosed in Unexamined Japanese Patent Publication No. 2013-24534, whether the person moves is detected using the image of the camera, a height of the person is estimated when the person moves, an obstacle is detected in a room from a movement history of the person, and a detection result of the obstacle is used in air conditioning control of an air conditioning apparatus (air conditioner). Unexamined Japanese Patent Publication No. 2002-197463 discloses a method for determining stillness and movement or a posture of the person by monitoring change in coordinate of a top head among plural frame images. Unexamined Japanese Patent Publication No. 2013-37406 discloses a method for estimating a height using a detection result of a head in an image.

(1) A technique of calculating an existence position (a position on a real world) of the person by estimating a depth distance (a distance between the camera and the person) from a size of the person in the image and (2) a technique of calculating the existence position of the person through a triangulation principle by photographing the person from two directions using two cameras are well known as a typical technique of calculating the existence position of the person from the image of the camera.

However, in technique (1), distance estimation accuracy is not stable because the depth distance is estimated based on the size of the person in the image, a detection result of the size varies largely depending on image quality, resolution, a physical constitution or a body shape of the person, and a posture. On the other hand, in technique (2), because of the necessity of two cameras, device cost increases compared with the device of a monocular camera. The images of the two cameras are separately processed, and a result is obtained by a combination of the pieces of information on the images. Therefore, the processing may become complicated.

SUMMARY

One or more embodiments of the present invention provides a technology for improving the estimation accuracy by a simple method in the processing of detecting the person from the image of the camera and estimating information on the sensing area based on a detection result.

According to one or more embodiments of the present invention, an area information estimating device includes a camera configured to photograph a sensing area, a person detector configured to detect a person from an image of the camera, and a position calculator configured to calculate an existence position of the person in the sensing area based on a coordinate on the image in which the person is detected by the person detector. At this point, the person detector excludes the person in whom a relationship between the coordinate and a size on the image does not satisfy a predetermined condition from a detection target.

In the above configuration, the person in whom the relationship between the coordinate and the size on the image does not satisfy the predetermined condition (data degrading the estimation accuracy) is excluded, so that the information on the sensing area can accurately be estimated. It is only necessary to determine and estimate whether or not the relationship between the coordinate and the size on the image satisfies the predetermined condition. Therefore, the simple processing can easily be performed at high speed.

The person detector detects an upper body of the person, and the position calculator may obtain a coordinate on a foot image of the person detected by the person detector from a coordinate and a size on an upper body image of the person, and calculate the existence position of the person in the sensing area from the coordinate on the foot image. In the above configuration, the existence position is calculated from the foot coordinate (that is, the coordinate of a point that is in contact with the floor surface), so that the distance accuracy can be improved. Therefore, the information on the sensing area can accurately be estimated.

The person detector may change the predetermined condition between the case that the detected person is in a sitting position and the case that the detected person is in a standing position. The case of the sitting position differs from the case of the standing position in the coordinate on the image, so that both the existence positions of the person in the sitting position and the person in the standing position can accurately be obtained by changing the predetermined condition according to the coordinate on the image.

The person detector performs upper body detection detecting the upper body of the person and whole body detection detecting a whole body of the person, the person detector may determine that the person is in the standing position both when the upper body of the person is detected in the upper body detection and when the whole body of the person is detected in the whole body detection, and the person detector may determine that the person is in the sitting position when the upper body of the person is detected in the upper body detection while the whole body of the person is not detected in the whole body detection. Therefore, the person in the sitting position and the person in the standing position can be classified by the simple method.

According to one or more embodiments of the present invention, an area information estimating device includes a camera configured to photograph a sensing area, a person detector configured to detect a person from an image of the camera, and a position calculator configured to calculate an existence position of the person in the sensing area based on a coordinate on the image in which the person is detected by the person detector. At this point, the person detector sets only the person in whom a whole body in a standing position is photographed in the image to a detection target. In the above configuration, a sitting person or a partially-hidden person can be excluded from the detection target using only the detection result of the whole body. Therefore, the information on the sensing area can accurately be estimated.

The position calculator may calculate the existence position of the person detected by the person detector in the sensing area from a coordinate of a foot image of the person. In the above configuration, the existence position is calculated from the foot coordinate (that is, the coordinate of a point that is in contact with the floor surface), so that the distance accuracy can be improved. Therefore, the information on the sensing area can accurately be estimated.

According to one or more embodiments of the present invention, an area information estimating device includes a camera configured to photograph a sensing area, a person detector configured to detect a person from an image of the camera, and a position calculator configured to calculate an existence position of the person in the sensing area based on a coordinate on the image in which the person is detected by the person detector. At this point, the person detector detects an upper body of the person, and the position calculator obtains a coordinate on a foot image of the person detected by the person detector from a coordinate and a size on an upper body image of the person, and calculates the existence position of the person in the sensing area from the coordinate on the foot image. In the above configuration, the existence position is calculated from the foot coordinate (that is, the coordinate of a point that is in contact with the floor surface), so that the distance accuracy can be improved. Therefore, the information on the sensing area can accurately be estimated.

The position calculator may obtain the coordinate of the foot by calculating a ratio of the upper body to a size. Generally, because of a roughly identical size ratio of the human body, the proper estimation result can be obtained only by the calculation of the ratio of the upper body size. Therefore, the simple processing can be performed.

The area information estimating device may further include an estimator configured to estimate an existence allowable area where a person can exist in the sensing area based on a distribution of the existence position of the person detected in a predetermined period in the sensing area. The estimator may superpose each detected existence position on plan view in a form of a probability density distribution, and determine an area where a cumulative probability becomes greater than or equal to a predetermined level as the existence allowable area. In the configuration, an influence of the detection error can be reduced by recognizing the detected existence position as the probability density distribution, and the existence allowable area of the person can accurately be estimated.

An area information estimating device according to one or more embodiments of the present invention may include at least a part of the above configurations and functions. According to one or more embodiments of the present invention, an air conditioning apparatus, a monitoring camera, an image sensor, a robot vision, a computer vision, and a household electrical appliance may include an area information estimating device according to one or more embodiments of the present invention. An area information estimating method according to one or more embodiments of the present invention may include at least a part of the above pieces of processing. A program according to one or more embodiments of the present invention may cause a computer to perform an area information estimating method according to one or more embodiment of the present invention. According to one or more embodiments of the present invention, a computer-readable recording medium may include a program according to one or more embodiments of the present invention recorded in a non-transitory manner. A combination of the above configurations and pieces of processing is within the scope of the present invention, as long as a technical inconsistency is not generated.

Accordingly, according to one or more embodiments of the present invention, the estimation accuracy can be improved by the simple method in the processing of detecting the person from the image of the camera and estimating information on the sensing area based on the detection result.

BRIEF DESCRIPTION OF THE DRAWINGS

FIGS. 8A, 8B, and 8C are views illustrating a correlation between a detection coordinate and a detection size;

DETAILED DESCRIPTION

Hereinafter, embodiments of the present invention will be described in detail with reference to the drawings. Unless explicitly stated to be so limited, the present invention is not limited to a size, a material, a shape, a relative position, and the like of a component described in the following embodiments. In embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid obscuring the invention.

First Embodiment (Apparatus Configuration)

Figure 1:
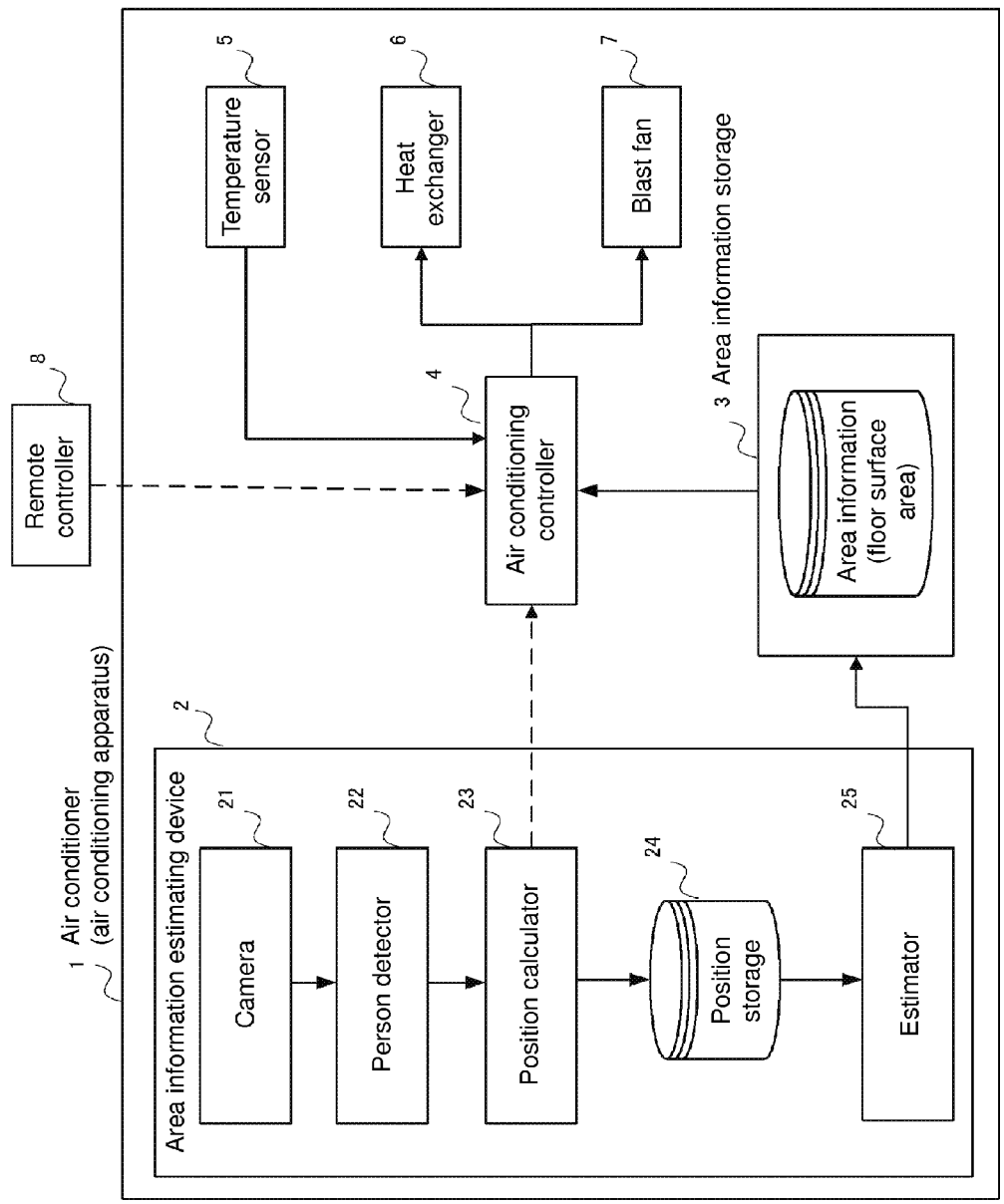
FIG. 1 is a view illustrating a functional block of an air conditioner.
Figure 2A:
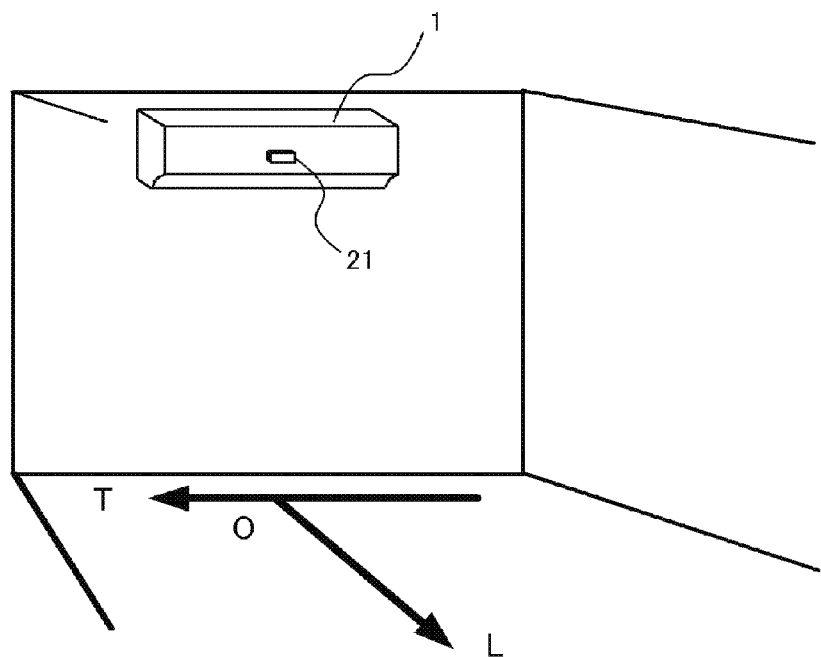
FIGS. 2A and 2B are views illustrating an appearance of the air conditioner.
Figure 2B:
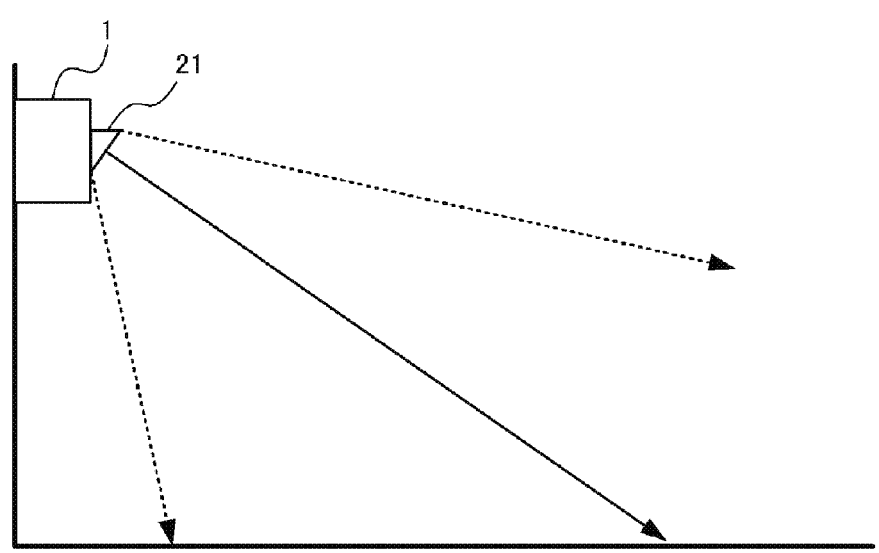

An entire configuration of an air conditioning apparatus (hereinafter, referred to as an "air conditioner") according to a first embodiment of the present invention will be described with reference to FIGS. 1, 2A, and 2B. FIG. 1 is a view illustrating a functional block of the air conditioner, and FIGS. 2A and 2B are views illustrating an appearance of the air conditioner. An air conditioner 1 includes an area information estimating device 2 provided with a person detection function, and has a function of performing air conditioning control based on information (hereinafter, also referred to as "area information" or "spatial information") on a room or a space that is estimated by the area information estimating device 2.

The air conditioner 1 mainly includes an area information estimating device 2, an area information storage 3, an air conditioning controller 4, a temperature sensor 5, a heat exchanger 6, and a blast fan 7. The area information on the room in which the air conditioner 1 is installed is stored in the area information storage 3. The area information estimating device 2 includes a camera 21, a person detector 22, a position calculator 23, a position storage 24, and an estimator 25.

The air conditioning controller 4 is constructed with a processor, a memory, and the like. The processor executes a program to decide a running condition such as a desired temperature, a desired wind direction, and a desired air flow, and controls the heat exchanger 6 and the blast fan 7 such that the air conditioner 1 operates on the running condition. The air conditioning controller 4 can also decide the running condition in consideration of the area information that is estimated by the area information estimating device 2 and stored in the area information storage 3 in addition to a setting condition (such as a setting temperature) input from the remote controller 8 and an indoor temperature obtained from the temperature sensor 5. The area information estimating device 2 is provided with the person detection function, so that the air conditioning controller 4 can also decide the running condition in consideration of a real-time person detection result.

For example, the temperature sensor 5 acquires the indoor temperature with an infrared sensor. The heat exchanger 6 is connected to an outdoor unit (not illustrated) to constitute a refrigerating cycle, and heats or cools air taken in the heat exchanger 6. The blast fan 7 generates an air current to circulate indoor air. The air flow and the wind direction (a vertical direction and a horizontal direction) can be adjusted in the blast fan 7.

The area information estimating device 2 detects a person from an image in which an area (hereinafter, referred to as a "sensing area") becoming an estimation target is photographed, records an existence position of the person in the sensing area, and generates area information based on a distribution of the existence position. In the first embodiment, an area (hereinafter, referred to as a "floor surface area") where a floor surface is exposed in the sensing area is estimated as the area information. As used herein, the term "floor surface is exposed" means a state in which an object, such as furniture and fixtures, a post, and a wall, which obstructs passage or activity of the person, does not exist. In other words, the floor surface area is an area (hereinafter, referred to as an "existence allowable area") where the person can exist (pass) in the sensing area. The air conditioning control is performed in consideration of the floor surface area, which allows heating or cooling to be efficiently performed.

The area information estimating device 2 is constructed with a computer including a processor, a memory, and the camera 21, and the processor executes a program to implement the functions of the person detector 22, the position calculator 23, the position storage 24, and the estimator 25. A part of or all the functional units may be constructed with an ASIC or an FPGA circuit. For example, the area information estimating device 2 is provided as a built-in type board computer in which the processor, the memory storing various programs, a camera module, and an external interface are mounted on a circuit board.

As illustrated in FIG. 2A, the camera 21 is attached to a front surface of the air conditioner 1 to photograph an inside of the sensing area (for example, a room), which allows the acquisition of the image. As illustrated in FIG. 2B, a photographing direction (optical axis direction) of the camera 21 of the first embodiment is a downward direction by a predetermined angle with respect to a horizontal plane, and the sensing area can be photographed from obliquely above. When the optical axis direction of the camera 21 is set as illustrated in FIG. 2B, an area close to the air conditioner 1 can fall within a view angle (visual field) of the camera 21. However, it is not always necessary to downwardly set the optical axis direction of the camera 21 with respect to the horizontal plane. For example, the optical axis direction may be set horizontally or slightly upward with respect to the horizontal plane (that is, it is only necessary that the area to be photographed fall within the view angle (visual field) of the camera 21). The camera 21 periodically performs the photographing (captures the image), and the person detector 22 performs person detection processing based on the photographed image. A photographing interval can arbitrarily be set. For example, the photographing may be performed at intervals such as several second and several minutes, the photographing interval may be changed depending on a period of time, or the photographing interval may be shortened when the person is detected.

The person detector 22 has the function of detecting the person from the image photographed with the camera 21. Various algorithms are proposed as a technique of detecting the person from the image. Examples of the algorithm include "face detection" that detects a portion like a face based on a local density difference of an eye or a mouth or a color feature such as a hair color and a skin color and "human body detection" that detects a head, an upper body, or a whole body based on a silhouette (contour). Any algorithm may be adopted in the person detector 22, or plural kinds of algorithms may be combined. The face detection has an advantage of a low chance that an object except for the person is falsely detected. On the other hand, the human body detection (silhouette detection) has an advantage of high robustness against an orientation or a posture of the person. In the human body detection, which one of the head, the upper body, and the whole body is set to a detection target depends on a way to provide data used in learning of a classifier. That is, when the upper body is detected, the classifier is caused to learn the feature of the silhouette of the upper body using a teacher image in which the upper body (for example, a portion above a breast) is photographed. When the whole body is detected, it is only necessary to perform the learning using the teacher image in which the head to a foot are photographed. At this point, the robust human body detection can be performed against a posture change when the teacher images of various orientations and postures such as a forward-looking orientation, an obliquely-looking orientation, a sideway-looking orientation, a rearward-looking orientation, an erect posture, and a walking posture.

The position calculator 23 has the function of calculating the existence position of the person in the sensing area based on a coordinate on the image in which the person is detected by the person detector 22. Particularly, the position calculator 23 performs processing of transforming an image coordinate (X,Y) into a position coordinate (T,L) on the floor surface in a real space by a geometric calculation in which already-known parameters such as the view angle and the installation angle of the camera 21 are used. In an image coordinate system of the first embodiment, an origin O is set to a center at a lower end of the image, an X-axis is set to a horizontal direction of the image, and Y-axis is set to a vertical direction of the image. As illustrated in FIG. 2A, in a floor surface coordinate system, an origin O is set to a foot of a perpendicular dropped from the camera 21 to the floor surface, an L-axis is set to a straight line in which an optical axis of the camera 21 is projected to the floor surface, and a T-axis is set so as to be orthogonal to the L-axis. That is, L is a horizontal distance in the optical axis direction, and T is a horizontal distance in a direction orthogonal to the optical axis.

The position storage 24 is a database in which the person's existence position (T,L) calculated by the position calculator 23 is stored. Not only the information on the person's existence position but also additional information such as a detection clock time may be stored in the position storage 24 while the additional information is correlated with the information on the person's existence position. When the person detection processing is continuously performed in a certain level of period (for example, several hours to several days), a distribution (history) of the person's existence positions acquired in the period is accumulated in the position storage 24.

The estimator 25 has the function of estimating the floor surface area (person existence allowable area) based on the distribution of the person's existence positions accumulated in the position storage 24. In the case that furniture and fixtures are installed in the room, the area where the person can pass (exist) is limited to the area where furniture and fixtures are not installed, namely, the floor surface area. Accordingly, the floor surface area in the room can be estimated by analyzing the distribution of the person's existence positions accumulated in a certain period. The area information obtained by the estimator 25 is stored in the area information storage 3, and used in the air conditioning control of the air conditioning controller 4.

(Processing Flow)

Figure 3:
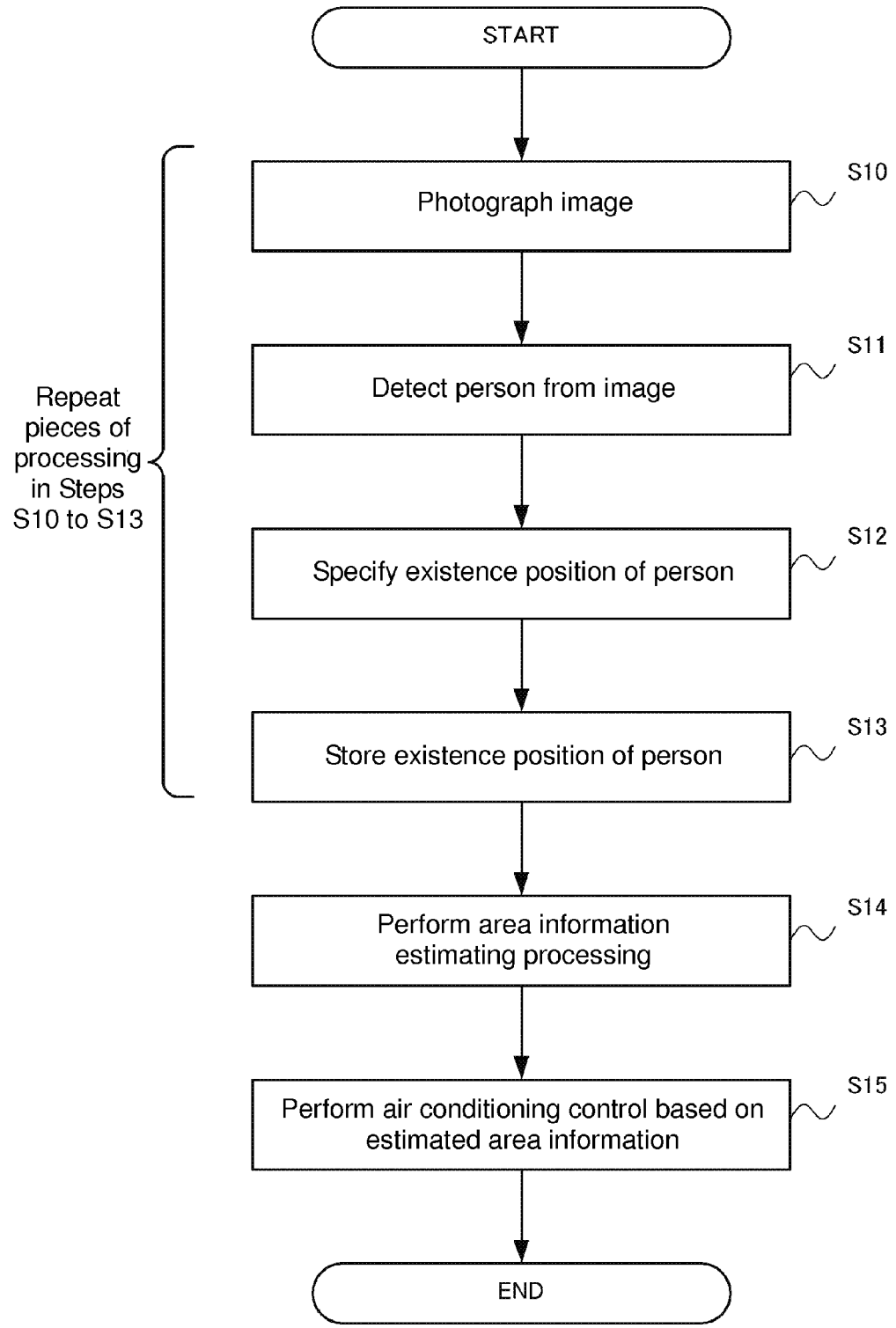
FIG. 3 is a flowchart illustrating an entire flow of air conditioning control processing.

A flow of air conditioning control processing performed by air conditioner 1 will be described below with reference to a flowchart in FIG. 3. FIG. 3 is the flowchart illustrating the entire flow of the air conditioning control processing.

The camera 21 captures the overhead image of the room (sensing area) in which the air conditioner 1 is installed (Step S10). The gray scale image having a horizontal pixel number Hp of 1200 and a vertical pixel number Vp of 1600 is captured in the first embodiment.

Figure 4A:
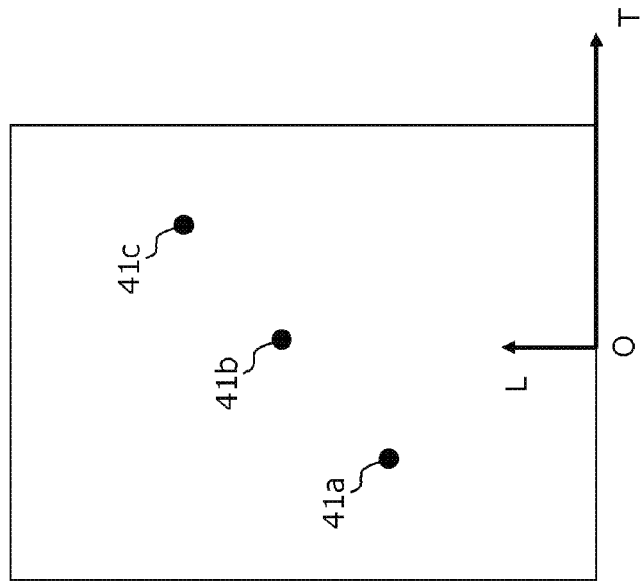
FIG. 4A is a view illustrating processing of detecting a person from an image.

The person detector 22 detects the person from the image (Step S11). FIG. 4A illustrates a detection result example in which three persons 41a, 41b, and 41c are detected from one image. The person detector 22 acquires the coordinate and the size on the image with respect to the detected persons 41a to 41c. In the first embodiment, the upper body detection (the human body detection using the silhouette of the portion above the breast) is used as the person detection algorithm, and a center axis (Xc,Yc) of a square surrounding the upper body of each of the detected persons 41a to 41c and a size (the number of pixels in one side) S of a detection rectangle are output. Hereinafter, a rectangle surrounding the detected person is referred to as a "detection rectangle", and the center axis (Xc,Yc) of the detection rectangle is referred to as a "detection coordinate".

Figure 4B:
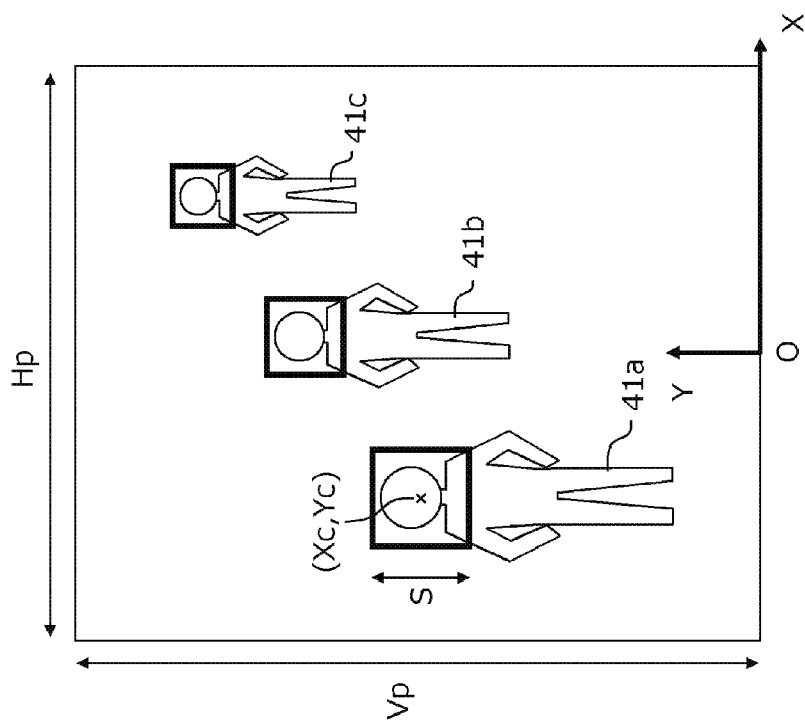
FIG. 4B is a view illustrating processing of calculating an existence position.

The position calculator 23 obtains the existence position (T,L) of each of the detected persons 41a to 41c in the sensing area based on the detection coordinate (Xc,Yc) of each of the persons 41a to 41c and the size S (Step S12). FIG. 4B illustrates a calculation example of the existence position (T,L) of each of the detected persons 41a to 41c. FIG. 4B is a plan view of the floor surface when the floor surface is viewed immediately above, and FIG. 4B shows that the persons 41a, 41b, and 41c are located farther than the camera 21 in this order.

A specific example of the coordinate calculated by the position calculator 23 will be described with reference to FIGS. 4 and 5. At this point, it is assumed that the horizontal pixel number Hp [pixel] and the vertical pixel number Vp [pixel] of the image, a person body width W [mm], a camera looking-down angle (an angle formed by a horizontal plane and an optical axis) α [degree], a camera horizontal view angle θ [degree], and a camera vertical view angle β [degree] are provided as the already-known parameters. The horizontal pixel number Hp, the vertical pixel number Vp, and the camera vertical view angle β are fixed from a specification of the camera 21, and the camera looking-down angle α is fixed from the installation angle of the camera 21 with respect to the air conditioner 1. A value (for example, 450 mm) of an average shoulder width of an adult may be used as the person body width W.

Figure 5A:
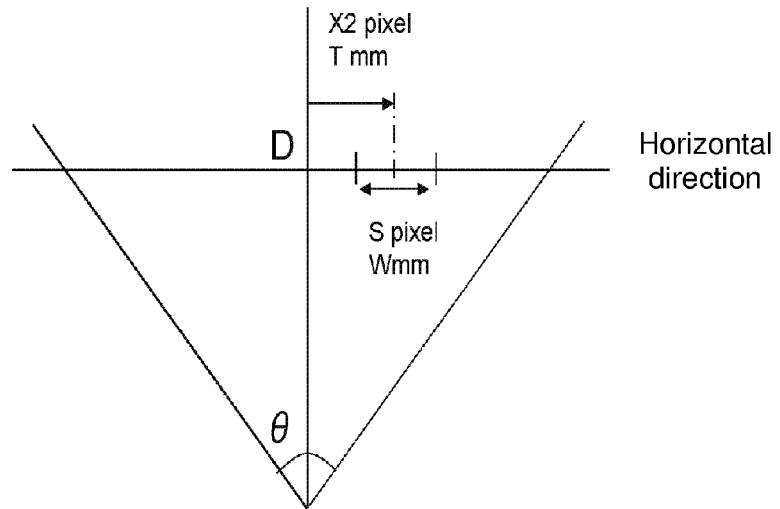
FIGS. 5A and 5B are views illustrating a specific example of a coordinate calculation performed by a position calculator.

It is assumed that, when the person exists at a position of a distance D [mm] in the optical axis direction from the camera 21, the person has the detection coordinate (Xc,Yc) and the size S [pixel]. Because a ratio of a size [pixel] on the image and a size [mm] on the real space becomes S [pixel]:W [mm] at the position separated from the camera 21 by the distance D, the horizontal position T [mm] of the person is obtained from $$T=(X2 \times W)/S$$

as illustrated in FIG. 5A. Where X2 is a horizontal pixel number from the center (0, Vp/2) of the image to the detection coordinate (Xc,Yc) of the person (X2=Xc).

Figure 5B:
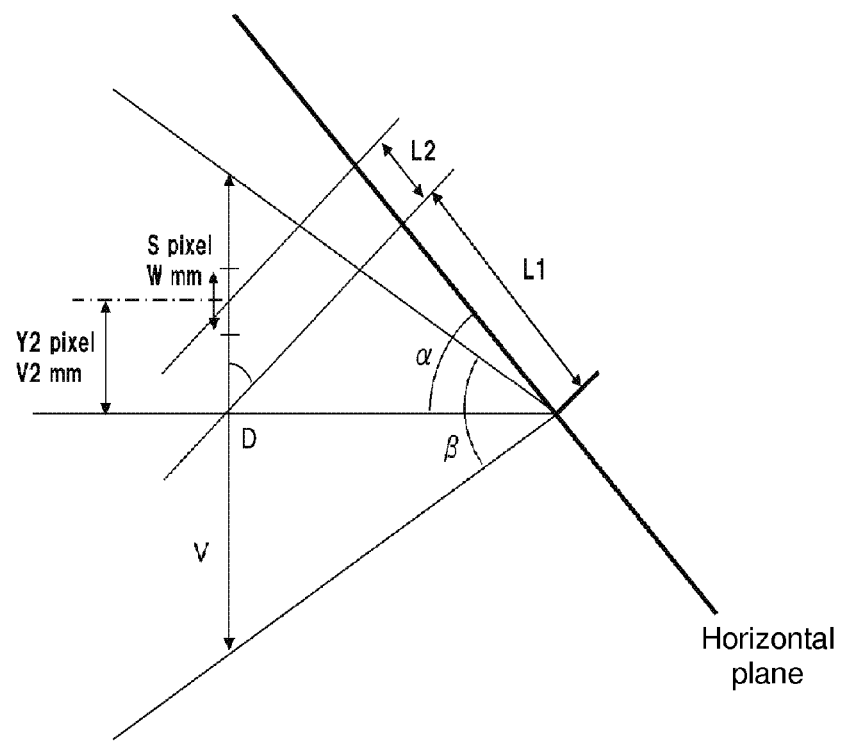

Derivation of the depth position L [mm] will be described below. As illustrated in FIG. 5B, assuming that V [mm] is the vertical distance on a side of a physical object falling within the vertical view angle β at the position separated from the camera 21 by the distance D, an equation $$\tan(\beta/2)=(V/2)/D$$

holds. Because an equation $$Vp/V=S/W$$

holds at the position separated from the camera 21 by the distance D, when the vertical distance V is eliminated from both the equations, an equation $$D=(Vp \times W)/(2 \times S \times \tan(\beta/2))$$

is obtained. Accordingly, a depth position L1 [mm] in FIG. 5B is obtained from $$L1 = D \times \cos\alpha$$
$$= (Vp \times W \times \cos\alpha)/(2 \times S \times \tan(\beta/2)).$$

At the position separated from the camera 21 by the distance D, it is assumed that Y2 (=Yc−Vp/2) is the vertical pixel number from the center of the image to the detection coordinate of the person, and that V2 [mm] is the vertical distance in the real space. At this point, because $$Y2/V2 = S/W$$

holds, a depth position L2 [mm] in FIG. 5B is obtained from $$L2 = V2 \times \sin \alpha = (Y2 \times W \times \sin \alpha)/S.$$

Therefore, the depth position L[mm] of the person can be calculated by $$L = L1 + L2$$
$$= (Vp \times W \times \cos\alpha)/(2 \times S \times \tan(\beta/2)) + (Yc \times W \times \sin\alpha)/S.$$

In the above coordinate calculation technique, assuming that the person body width W is kept constant, and the planar position of the person is estimated based on the size S on the image (that is, the person is located farther away from the camera 21 with decreasing size). The coordinate calculation technique has an advantage that the existence position (T,L) can be calculated even if an installation height (a height from the floor surface) of the camera 21 is unclear.

When the existence position (T,L) of each of the persons 41a to 41c detected from the image is obtained through the calculation, the flow goes to Step S13 in FIG. 3. In Step S13, the position calculator 23 stores the position coordinates of the persons 41a to 41c in the position storage 24. The pieces of processing in Steps S10 to S13 are repeatedly performed. Accordingly, the person's existence positions in the plural detection results are accumulated in the position storage 24.

Figure 6:
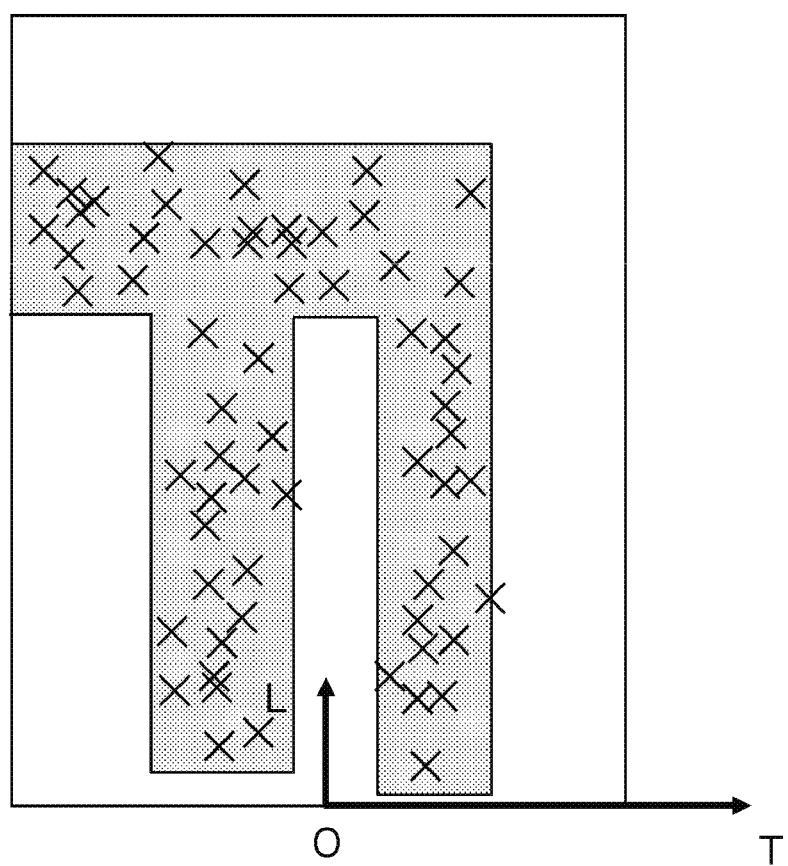
FIG. 6 is a plan view illustrating a room in which pieces of existence position information accumulated during a predetermined period are plotted.

After the pieces of processing in Steps S10 to S13 are repeated in the predetermined period, the estimator 25 estimates the floor surface area (person existence allowable area) based on the pieces of information on the person's existence position accumulated in the position storage 24 (Step S14). FIG. 6 is a schematic plan view illustrating the floor surface of the room in which the pieces of existence position information accumulated in the position storage 24 are plotted. The person is detected at the position indicated by a mark (x) in FIG. 6, and where the person acts in the room is seen from the distribution of the marks (x). That is, the area where the mark (x) is plotted can be regarded as the floor surface area where the person can pass (exist). On the other hand, the area where the mark (x) is not plotted is the area where furniture and fixtures are installed or a dead space, and can be regarded as the area where the person seldom passes (exists). A hatched area in FIG. 6 is the estimated floor surface area. The obtained area information is stored in the area information storage 3.

In Step S15, the air conditioning controller 4 performs the air conditioning control based on the acquired area information. For example, amenity can efficiently be improved by preferentially sending wind to a place where the person passes (exists) frequently. Alternatively, a wind flow is predicted based on a room shape, and the wind direction may be controlled such that room is airy.

(Scheme for Accuracy Improvement)

Figure 7:
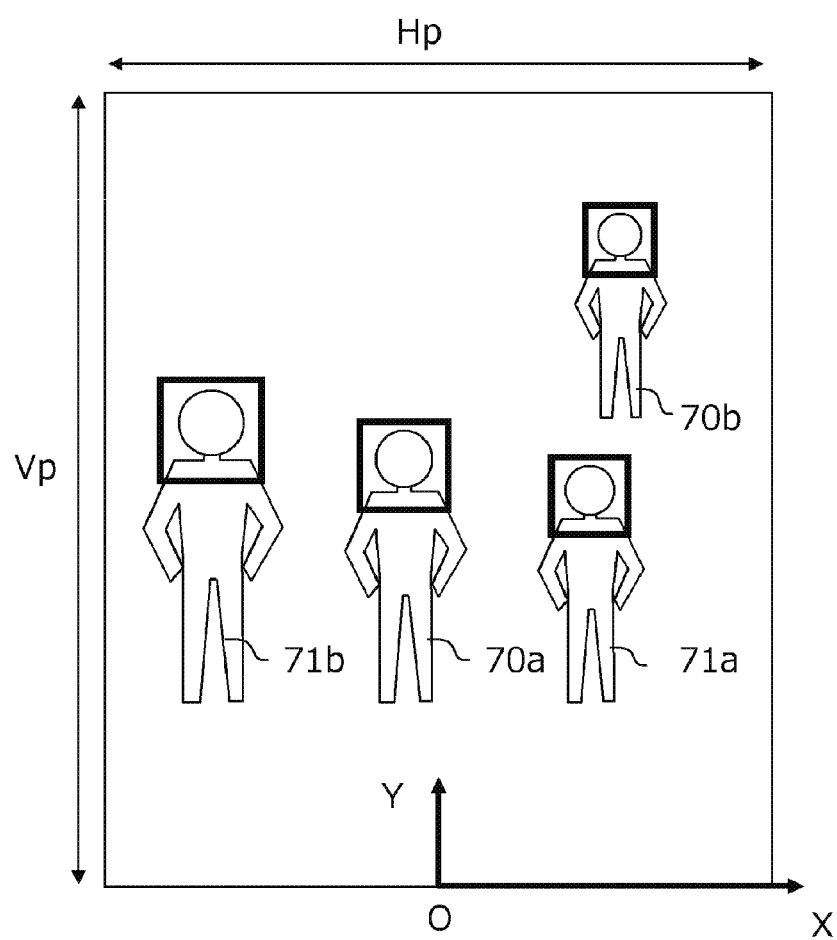
FIG. 7 is a view illustrating degradation of estimation accuracy in the case that body shapes differ from one another.

The good result is frequently obtained by the above method. However, in the case that a person who is largely deviated from a standard body shape is photographed in the image, there is a possibility of degrading estimation accuracy of the area information. Because the distance is calculated based on the average person body width W of the adult, the accuracy can be expected in the case that the size on the image decreases as the depth position of the person is located farther as illustrated in FIG. 4A. However, as illustrated in FIG. 7, it is falsely recognized that a small person 71a is located farther than the actual distance (the distance of a person 70a having a standard body shape) while it is falsely recognized that a large person 71b is located closer than the actual distance. Although a certain level of error is permissible, sometimes an error is not negligible depending on an application when the error exceeding, for example, 1 m is generated with respect to the distance on the floor surface.

Therefore, in the person detector 22 of the first embodiment, the detection target (data used to estimate the area information) is limited to the body shape within a specific range and the person in the standing position to suppress the degradation of the estimation accuracy of the area information. Specifically, the person detector 22 regards the person in whom a relationship between the detection coordinate and the size on the image does not satisfy a predetermined condition in persons detected from the image as a noise (data degrading the estimation accuracy), and the person detector 22 excludes the person from the detection target.

FIG. 8A illustrates a result in which the detection coordinate (Xc,Yc) and the detection size S [pixel] of a subject are plotted. In FIG. 8A, a horizontal axis indicates the detection coordinate (Xc,Yc) of the subject, and a vertical axis indicates the detection size S. The detection coordinate (Xc,Yc) and the detection size S are acquired from sample images that are photographed while the subject having the standard body shape stands with various distances. Experimental conditions in FIG. 8B are as follows.

The subject having a person body width (shoulder width) W of 450 mm and a height H of 1750 mm The camera installation height h of 2200 mm, the camera looking-down angle α of 25 degrees, the camera vertical view angle β of 56.6 degrees, and the vertical pixel number Vp of 1600 pixels As can be seen from FIG. 8A, in the case that the person is limited to the person having the same body shape and posture, the size S and the vertical coordinate Yc on the image have a correlation, and the size S increases with decreasing vertical coordinate Yc (as the person moves downward in the image). The size S corresponding to each vertical coordinate Yc can be fixed from the experimental result. Hereinafter, the proper size S corresponding to the vertical coordinate Yc is referred to as a "reference value Sref". A relationship between the vertical coordinate Yc and the reference value Sref may be held by a function Sref=f (Yc), or by a look-up table in FIG. 8C.

Figure 9:
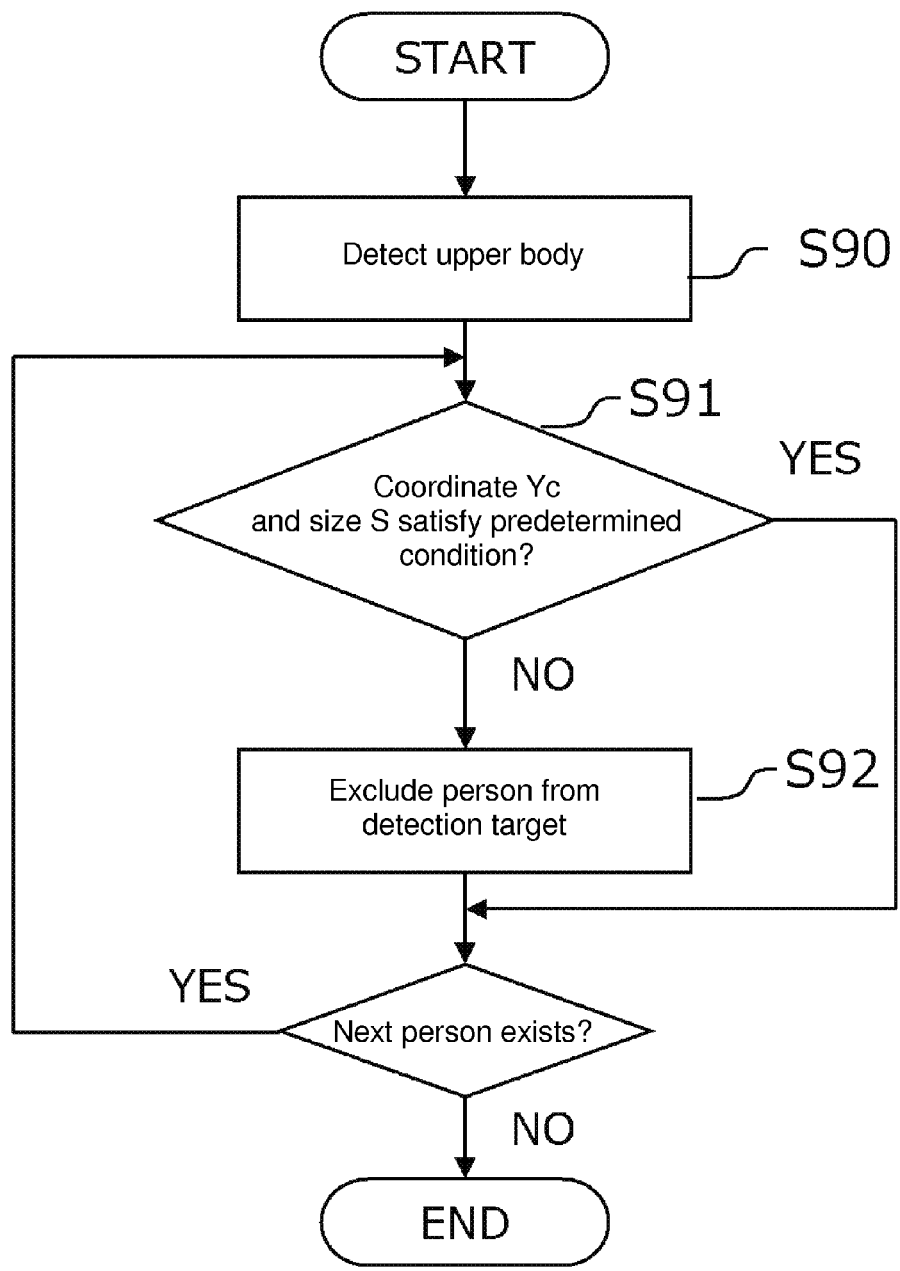
FIG. 9 is a flowchart illustrating a flow of person detection processing of a first embodiment.

The person detection processing in consideration of the relationship between the detection coordinate Yc and the detection size S on the image will be described below with reference to a flowchart in FIG. 9. The flowchart in FIG. 9 corresponds to a detailed flow of Step S11 in FIG. 3.

The person detector 22 detects the upper body of the person from the image (Step S90). The persons 70a and 70b having the standard body shape, the small person 71a, and the large person 71b are detected in the case that the image in FIG. 7 is used.

Then the person detector 22 determines whether the relationship between the detection coordinate Yc and the detection size S satisfies the predetermined condition in each person detected in Step S90 (Step S91). In the first embodiment, the person detector 22 acquires the reference value Sref corresponding to the detection coordinate Yc from the look-up table in FIG. 8C, and calculates an absolute value |S−Sref| of a difference between the detection size S and the reference value Sref. In the case that the absolute value |S−Sref| is smaller than a predetermined threshold Th (|S−Sref|<Th), it is determined that the relationship between the detection coordinate Yc and the detection size S satisfies the predetermined condition. The threshold Th is a parameter that decides a variation of the body shape (person body width W) permissible as the detection target. The limitation of the detection target becomes strict with decreasing threshold Th, and the permissible variation increases with increasing threshold Th. The threshold Th may be decided according to a permissible value of the estimation error of the existence position.

The person in which the determination that "the predetermined condition is not satisfied" is made in Step S91 is removed from the detection result (Step S92). In the example of FIG. 7, the small person 71a and the large person 71b are excluded, and the person detector 22 outputs only the detection results of the persons 70a and 70b having the standard body shape.

The subsequent pieces of processing (Steps S12 to S14 in FIG. 3) are performed using only a person detection result in which the noise is excluded, which allows the floor surface area to be accurately estimated in the sensing area.

The experimental result in FIGS. 8A, 8B, and 8C, the correlation between the detection coordinate Yc and the reference value Sref, the threshold Th are described by way of example, and should properly be set depending on the specifications and installation conditions of the possible body shape and camera. In the first embodiment, the correlation between the detection coordinate Yc and the reference value Sref is obtained by the subject experiment. Alternatively, the correlation between the detection coordinate Yc and the reference value Sref may be obtained using the following equation through a geometric calculation based on the specifications and installation conditions of the possible body shape and camera.

$$Sref = \frac{W \cos\alpha}{A} \times Yc \qquad \text{[Mathematical formula 1]}$$

Where:

$$A = \frac{-(H - L/\tan\alpha - h)}{\sqrt{1 + 1/\tan^2\alpha}} \times \tan(\beta/2) + \frac{|H + L\tan\alpha - h|}{\sqrt{1 + \tan^2\alpha}};$$

$$L = \frac{-(K+1)\times(H-h)}{\tan\alpha - K/\tan\alpha}; \text{ and}$$

$$K = \frac{\sqrt{1 + \tan^2\alpha}}{\sqrt{1 + 1/\tan^2\alpha}}\left(\frac{Yc}{Vp} - \frac{1}{2}\right)\times 2\tan(\beta/2).$$

An average value of the adult is used with respect to the person body width W [mm] and the height H [mm], and an already-known parameter is used with respect to the camera installation height h [mm], the camera looking-down angle α [degree], the camera vertical view angle β [degree], and the vertical pixel number Vp [pixel].

Second Embodiment

A second embodiment of the present invention will be described below. The second embodiment differs from the first embodiment in that the whole body detection is used as the person detection algorithm and that the existence position on the real space is calculated from the foot coordinate.

Figure 10A:
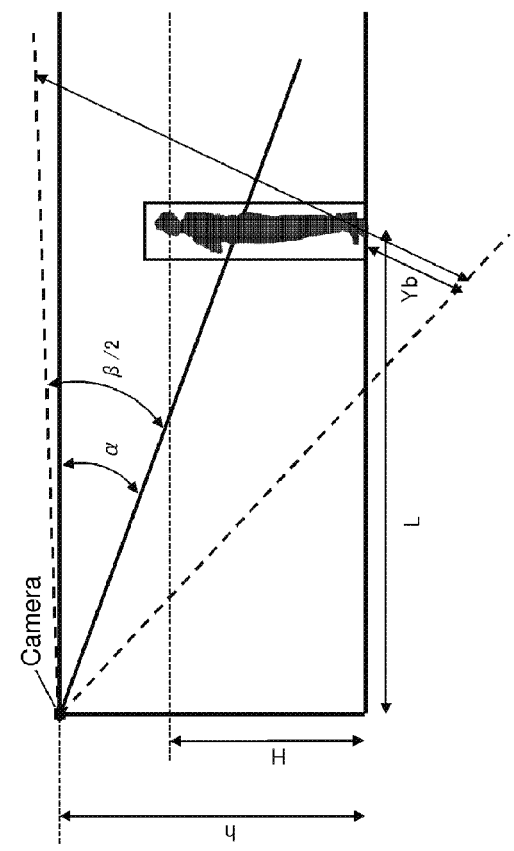
FIGS. 10A and 10B are views illustrating processing flows of a person detector and a position calculator of a second embodiment.

FIG. 10A schematically illustrates a detection result example of the person detector 22. In the person detector 22 of the second embodiment, the whole body detection (human body detection using the silhouette of the whole body from the head to the foot) is used as the person detection algorithm. The whole body is photographed in the image, only the person (persons 100a to 100c in FIG. 10A) in the standing position becomes the detection target, and a sitting person 101 and a partially-hidden person 102 are excluded as the noise (the data degrading the estimation accuracy). For example, the center axis (Xc,Yc) of the detection rectangle and a horizontal size Sh and a vertical size Sy of the detection rectangle are output as the detection result.

Figure 10B:
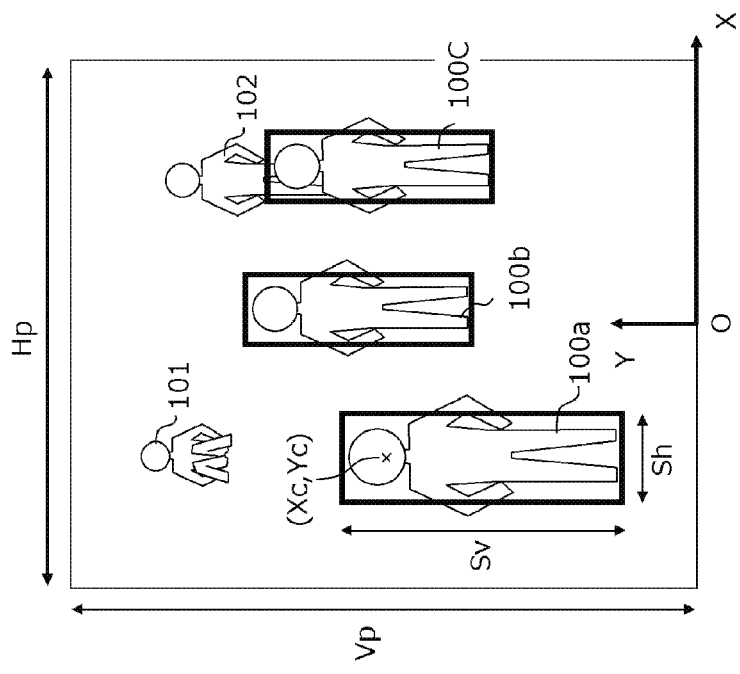

FIG. 10B schematically illustrates an example of the coordinate calculation of the position calculator 23. At this point, it is assumed that the horizontal pixel number Hp [pixel] and the vertical pixel number Vp [pixel] of the image, the camera installation height h [mm], the camera looking-down angle α [degree], and the camera vertical view angle β [degree] are provided as the already-known parameters. The horizontal pixel number Hp, the vertical pixel number Vp, and the camera vertical view angle β are fixed from the specification of the camera 21, the camera installation height h is fixed from the installation height of the air conditioner 1, and the camera looking-down angle α is fixed from the installation angle of the camera 21 with respect to the air conditioner 1.

The position calculator 23 calculates the vertical coordinate Yb [pixel] of the person's foot from the detection coordinate (Xc,Yc) and detection size (Sh,Sv) of the person.

$$Yb = Yc - Sv/2$$

When the vertical coordinate Yb of the foot is obtained, as illustrated in FIG. 10B, the depth position L [mm] of the person can geometrically be calculated from the following equation.

$$L = \frac{-(K+1)\times(-h)}{\tan\alpha - K/\tan\alpha} \qquad \text{[Mathematical formula 2]}$$

$$K = \frac{\sqrt{1 + \tan^2\alpha}}{\sqrt{1 + 1/\tan^2\alpha}}\left(\frac{Yb}{Vp} - \frac{1}{2}\right)\times 2\tan(\beta/2)$$

The horizontal position T may be calculated by the same technique as the first embodiment, or calculated from a ratio of the horizontal pixel number Hp and the vertical detection coordinate Yc.

In the technique of the second embodiment, the sitting person or the partially-hidden person can be excluded from the detection target using only the detection result of the whole body. Additionally, the depth position L is calculated from the foot coordinate (that is, the coordinate of the point that is in contact with the floor surface), so that the distance accuracy can be improved compared with the technique of the first embodiment of calculating the depth position L from the size of the detection size S. Therefore, the floor surface area can accurately be estimated in the sensing area.

Third Embodiment

A third embodiment of the present invention will be described below. A technique of estimating the foot coordinate from the detection result of the upper body is adopted in the third embodiment.

Figure 11A:
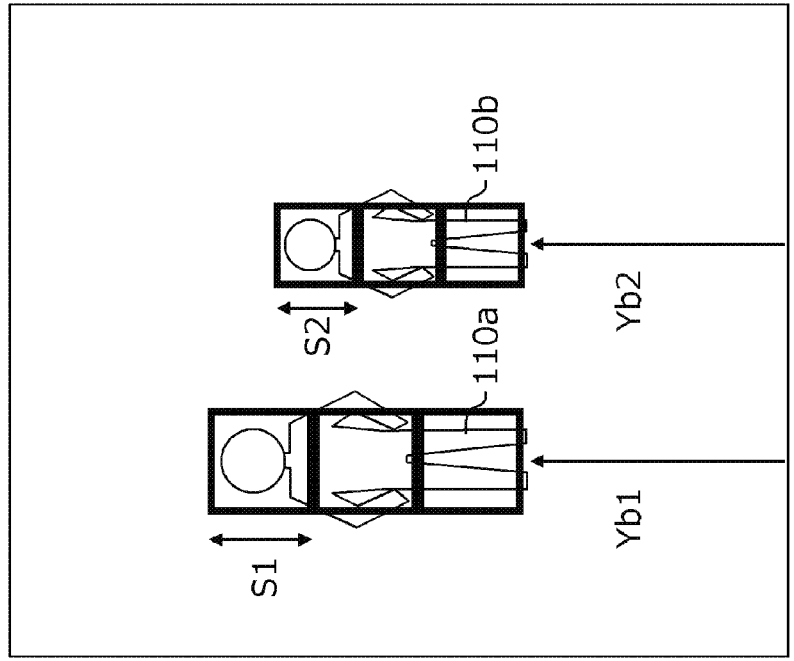
FIGS. 11A and 11B are views illustrating processing flows of a person detector and a position calculator of a third embodiment.

Processing flows of the person detector 22 and the position calculator 23 of the third embodiment will be described below with reference to FIGS. 11A and 11B. In the person detector 22 of the third embodiment, similarly to the first embodiment, the upper body detection (human body detection using the silhouette of the portion above the breast) is used as the person detection algorithm. FIG. 11A illustrates an example in which two persons 110a and 110b are detected. A difference between the detection coordinates Yc1 and Yc2 and a difference between the detection sizes S1 and S2 are generated depending on physical constitutions of persons 110a and 110b. Therefore, when the depth position L is calculated by the method of the first embodiment, an error is generated between the calculation results of the persons 110a and 110b even if the persons 110a and 110b are located at the substantially same distance.

Figure 11B:
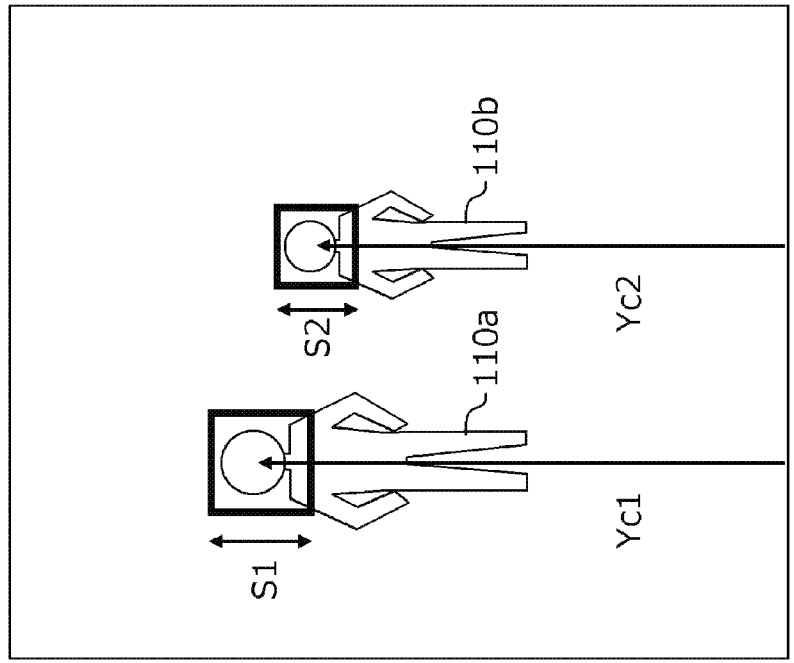

In the third embodiment, as illustrated in FIG. 11B, the position calculator 23 obtains foot coordinates Yb1 and Yb2 of the persons 110a and 110b from the detection coordinates Yc1 and Yc2 and detection sizes S1 and S2 of the persons 110a and 110b, and calculates the depth positions of the persons 110a and 110b from the foot coordinates Yb1 and Yb2. Any algorithm may be used to estimate the foot coordinate. In this case, the foot coordinate is simply obtained by calculating a ratio of the detection size (that is, the upper body size). Generally, because of a roughly identical size ratio of the human body, the proper estimation result can be obtained only by the calculation of the ratio of the upper body size. For example, assuming that a size ratio of the upper body and the whole body is set to 1:3, the foot coordinate Yb can be calculated from $$Yb=Yc-5S/2.$$

As can be seen from FIG. 11B, the foot coordinates Yb1 and Yb2 obtained by the ratio calculation are substantially matched with each other even if the detection coordinates Yc1 and Yc2 or the detection sizes S1 and S2 differ from each other.

After the foot coordinates Yb1 and Yb2 are obtained, the position calculator 23 calculates the existence positions of the persons 110a and 110b based on the foot coordinate. The specific calculation method is identical to that of the second embodiment.

In the technique of the third embodiment, the depth position L is calculated from the foot coordinate (that is, the coordinate of the point that is in contact with the floor surface), so that the distance accuracy can be improved compared with the technique of the first embodiment of calculating the depth position L from the size of the detection size S. Therefore, the floor surface area can accurately be estimated in the sensing area. In the third embodiment, the person in whom the relationship between the detection coordinate Yc and the detection size S does not satisfy the predetermined condition may be excluded from the detection target similarly to the first embodiment. The accuracy can be expected to be improved by the exclusion.

Fourth Embodiment

A fourth embodiment of the present invention will be described below. A method in which the upper body detection and the whole body detection are combined is adopted in the fourth embodiment.

Figure 12A:
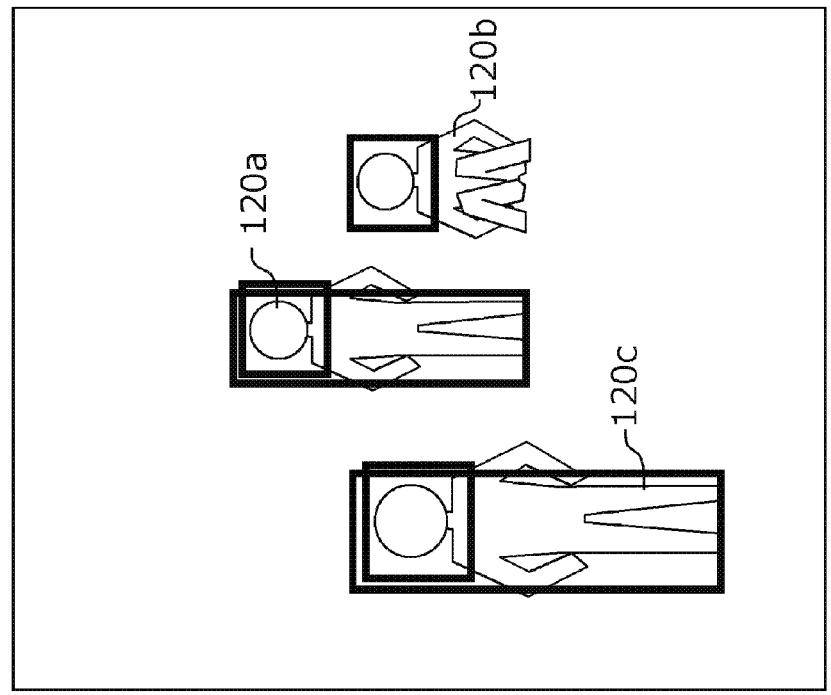
FIGS. 12A and 12B are views illustrating person detection processing of a fourth embodiment.

In the case that a person 120a in the standing position and a person 120b in the sitting position are located at the same distance (it is assumed that the persons 120a and 120b have the same body shape) as illustrated in FIG. 12A, the persons 120a and 120b are identical to each other in the detection size S while the persons 120a and 120b are different from each other in the detection coordinate Yc on the image. That is, the detection coordinate Yc of the person 120b in the sitting position is lower than that of the person 120a in the standing position. In the case that the detection target is excluded and selected based on the relationship between the detection coordinate Yc and the detection size S like the first embodiment, the person 120b in the sitting position is excluded from the detection target.

Figure 13:
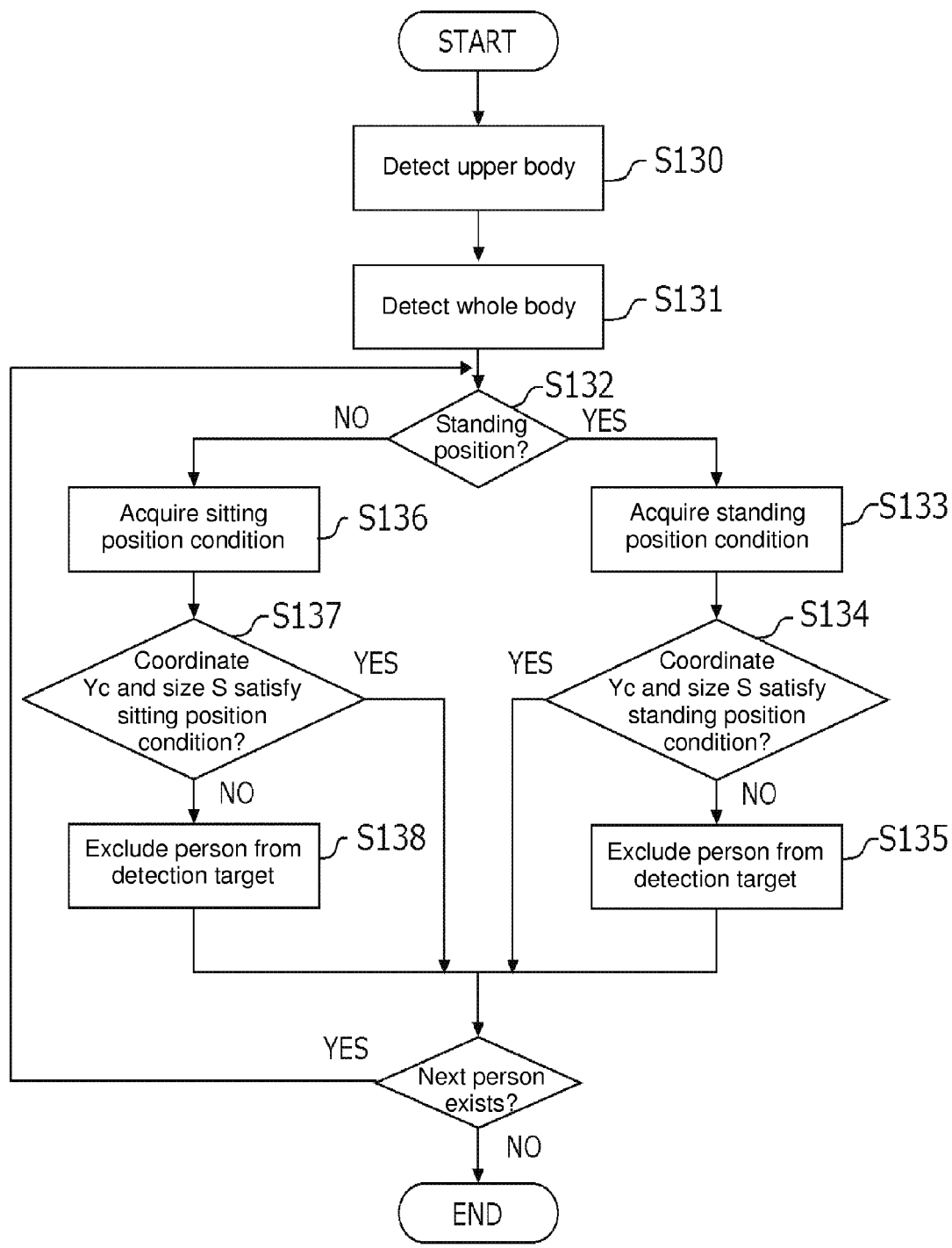
FIG. 13 is a flowchart illustrating a flow of person detection processing of the fourth embodiment.

In the fourth embodiment, the predetermined condition of the case that the detected person is in the sitting position differs from that of the case that the detected person is in the standing position, whereby the person 120b in the sitting position is also selected as the detection target. A specific processing flow will be described below with reference to FIG. 13. The flowchart in FIG. 13 corresponds to the detailed flow of Step S11 in FIG. 3 of the first embodiment.

Figure 12B:
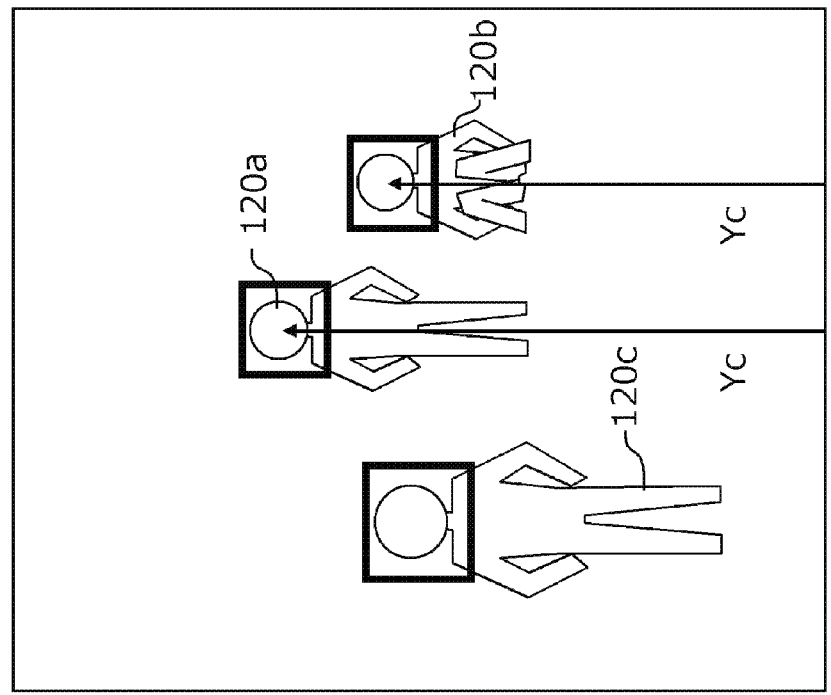

The person detector 22 detects the upper body from the image (Step S130). The person detector 22 also detects the whole body from the same image (Step S131). The upper body detection and the whole body detection may be performed in the reverse order. FIG. 12B illustrates an example of the detection result. As can be seen from FIG. 12B, the persons 120a and 120c in the standing position are detected in both the upper body detection and the whole body detection, and the persons 120b in the sitting position is detected only in the upper body detection.

Then the person detector 22 determines whether the relationship between the detection coordinate Yc and the detection size S satisfies the predetermined condition in each detected person. At this point, the processing in the case that the detected person is in the standing position (in the case that the detected person is detected in both the upper body detection and the whole body detection) differs from the processing in the case that the detected person is in the sitting position (in the case that the detected person is detected only in the upper body detection) (Step S132). That is, the person detector 22 acquires the reference value Sref corresponding to the detection coordinate Yc from a look-up table (or the function) for the standing position with respect to the person in the standing position (Step S133), the person detector 22 estimates whether the upper body size S of the person in the standing position falls within a permissible range (Step S134), and the person detector 22 excludes the person in the standing position from the detection target when the upper body size S of the person in the standing position is out of the permissible range (Step S135). On the other hand, the person detector 22 acquires the reference value Sref corresponding to the detection coordinate Yc from a look-up table (or the function) for the sitting position with respect to the person in the sitting position (Step S136), the person detector 22 estimates whether the upper body size S of the person in the sitting position falls within a permissible range (Step S137), and the person detector 22 excludes the person in the sitting position from the detection target when the upper body size S of the person in the sitting position is out of the permissible range (Step S138).

Then only the remaining detection result is output after the data of the person in the standing position and the data of the person in the sitting position are selected and excluded by different standards. The subsequent pieces of processing (Steps S12 to S14 in FIG. 3) are performed using only a person detection result in which the noise is excluded, which allows the floor surface area to be accurately estimated in the sensing area. In the fourth embodiment, the data of the person in the sitting position can also be used to estimate the floor surface area, so that the person existence allowable area can accurately be estimated without omission.

Fifth Embodiment

A fifth embodiment of the present invention will be described below. In the first to fourth embodiments, using the map in which the detected existence position is plotted on the plan view as illustrated in FIG. 6, the floor surface area is estimated based on the distribution of the plotted points (the marks (x)) (the existence or non-existence or the density of plotted point). On the other hand, in a configuration of the fifth embodiment, the estimator 25 superposes the detected existence position on the plan view using not the point but a probability density distribution (or a form similar to the probability density distribution) in which a detection error is considered, and determines the area where a cumulative probability is greater than or equal to a predetermined level as the floor surface area.

Figure 14A:
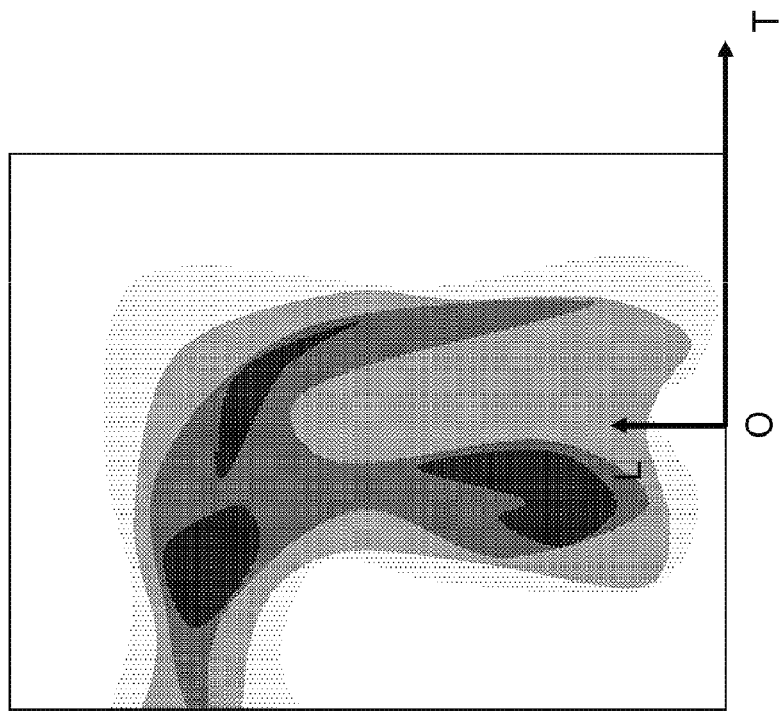
FIGS. 14A and 14B are views illustrating estimating processing of a fifth embodiment.

FIG. 14A illustrates an example of the probability density distribution plotted on the plan view when the person is detected at the position of a point (T1,L1). In this case, because the existence probability of the point (T1,L1) is considered to be the highest, a maximum value (for example, 10 points) is provided to the point (T1,L1). In consideration of the detection error, probability values are also provided to the points around the point (T1,L1) (for example, 8 points, 6 points, . . . , 1 point are provided from the side closer to the point (T1,L1)) according to the distance from the point (T1,L1). At this point, it is considered that the detection error is not even in all the direction, but that the detection error increases in the depth direction when viewed from the camera. Therefore, according to one or more embodiments of the present invention, the distribution that is long in the depth direction is used as illustrated in FIG. 14A.

Figure 14B:
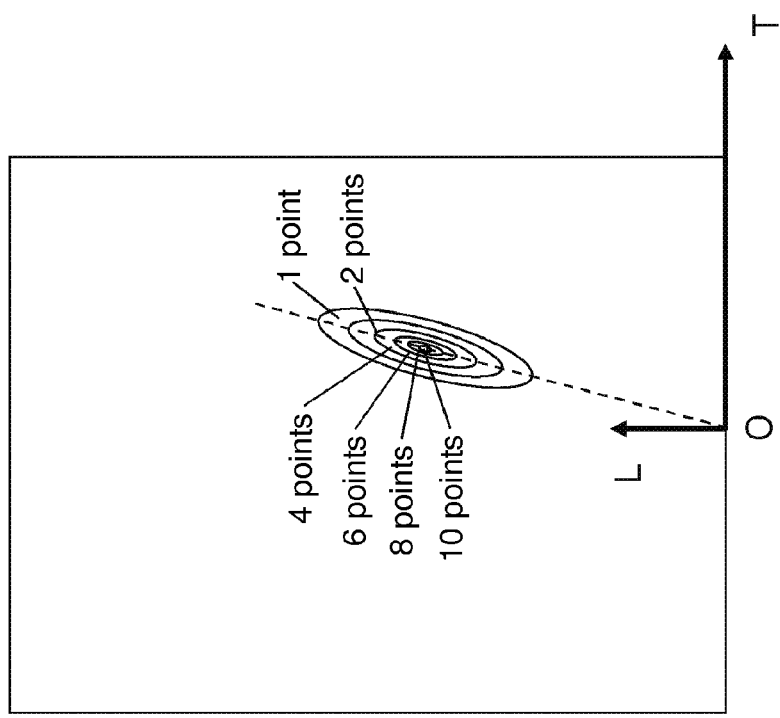

FIG. 14B illustrates an example in which the probability density distribution is superposed on each of many detection positions accumulated in the position storage 24. In FIG. 14B, the portion having the higher cumulative probability (higher cumulative point) is indicated by a darker color. That is, it is considered that there is more traffic as the color becomes darker. For example, after producing the cumulative map, the estimator 25 may determine the area where the cumulative probability (cumulative point) is larger than 80 points as the floor surface area.

In the configuration of the fifth embodiment, an influence of the detection error can be reduced by recognizing the detected existence position as the probability density distribution, and the floor surface area (person existence allowable area) can accurately be estimated.

Other Embodiments

The configurations of the above embodiments are merely illustrated as specific examples of the present invention, and the present invention is not limited to the configurations of the embodiments. Various specific configurations can be formed without departing from the scope of the present invention.

In one or more of the above embodiments, by way of example, the area estimation result is applied to the air conditioning control of the air conditioner. However, the present invention is not limited to the air conditioning control of the air conditioner. One or more embodiments of the present invention can suitably be applied to structure recognition (such as recognition of a person's flow line, a floor surface (including the ground), a work area, and a passage or an obstacle) in the sensing area in the monitoring camera, the image sensor, computer vision, robot vision, and the like. The above embodiments may be combined with one another as long as the technical inconsistency is not generated.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

The invention claimed is:

1. An area information estimating device comprising:
   a camera that photographs an image within a sensing area;
   a person detector that detects a person from the image from the camera;
   a position calculator that calculates an existence position of the person in the sensing area based on a coordinate on the image in which the person is detected by the person detector, wherein the person detector excludes the person in whom a relationship between the coordinate and a size on the image does not satisfy a predetermined condition from a detection target; and
   an estimator that estimates an existence allowable area where a person can exist in the sensing area based on a distribution of the existence position of the person detected in a predetermined period in the sensing area,
   wherein the estimator superposes each detected existence position on plan view in a form of a probability density distribution, and determines an area where a cumulative probability becomes greater than or equal to a predetermined level as the existence allowable area, and wherein the area information estimating device is included in an air conditioner that performs air conditioning control based on information estimated by the area information estimating device.

2. The area information estimating device according to claim 1,
   wherein the person detector detects an upper body of the person, and
   wherein the position calculator obtains a coordinate on a foot image of the person detected by the person detector from a coordinate and a size on an upper body image of the person, and calculates the existence position of the person in the sensing area from the coordinate on the foot image.

3. The area information estimating device according to claim 1, wherein the person detector changes the predetermined condition between the case that the detected person is in a sitting position and the case that the detected person is in a standing position.

4. The area information estimating device according to claim 3,
   wherein the person detector performs upper body detection detecting an upper body of the person and whole body detection detecting a whole body of the person,
   wherein the person detector determines that the person is in the standing position both when the upper body of the person is detected in the upper body detection and when the whole body of the person is detected in the whole body detection, and
   wherein the person detector determines that the person is in the sitting position when the upper body of the person is detected in the upper body detection while the whole body of the person is not detected in the whole body detection.

5. An area information estimating device comprising:
a camera that photographs an image within a sensing area;
a person detector that detects a person from the image from the camera;
a position calculator that calculates an existence position of the person in the sensing area based on a coordinate on the image in which the person is detected by the person detector, wherein the person detector sets only the person in whom a whole body in a standing position is photographed in the image to a detection target; and
an estimator that estimates an existence allowable area where a person can exist in the sensing area based on a distribution of the existence position of the person detected in a predetermined period in the sensing area,
wherein the estimator superposes each detected existence position on plan view in a form of a probability density distribution, and determines an area where a cumulative probability becomes greater than or equal to a predetermined level as the existence allowable area, and
wherein the area information estimating device is included in an air conditioner that performs air conditioning control based on information estimated by the area information estimating device.

6. The area information estimating device according to claim 5, wherein the position calculator calculates the existence position of the person detected by the person detector in the sensing area from a coordinate of a foot image of the person.

7. An area information estimating device comprising:
a camera that photographs an image within a sensing area;
a person detector that detects a person from the image from the camera;
a position calculator that calculates an existence position of the person in the sensing area based on a coordinate on the image in which the person is detected by the person detector; and
an estimator that estimates an existence allowable area where a person can exist in the sensing area based on a distribution of the existence position of the person detected in a predetermined period in the sensing area,
wherein the person detector detects an upper body of the person,
wherein the position calculator obtains a coordinate on a foot image of the person detected by the person detector from a coordinate and a size on an upper body image of the person, and calculates the existence position of the person in the sensing area from the coordinate on the foot image,
wherein the estimator superposes each detected existence position on plan view in a form of a probability density distribution, and determines an area where a cumulative probability becomes greater than or equal to a predetermined level as the existence allowable area, and
wherein the area information estimating device is included in an air conditioner that performs air conditioning control based on information estimated by the area information estimating device.

8. The area information estimating device according to claim 2, wherein the position calculator obtains the coordinate of the foot by calculating a ratio of the upper body to a size.

9. An area information estimating method comprising:
acquiring an image from a camera photographing a sensing area;
detecting a person from the image of the camera;
calculating an existence position of the person in the sensing area based on a coordinate on the image in which the person is detected by the person detection step; and
estimating an existence allowable area where a person can exist in the sensing area based on a distribution of the existence position of the person detected in a predetermined period in the sensing area,
wherein the person in whom a relationship between the coordinate and a size on the image does not satisfy a predetermined condition is excluded from a detection target in the person detection step, wherein the estimating step comprises superposing each detected existence position on plan view in a form of a probability density distribution, and determining an area where a cumulative probability becomes greater than or equal to a predetermined level as the existence allowable area, and wherein the area information estimating method is used to perform air conditioning control by an air conditioner based on information estimated by the area information estimating method.

10. A program stored on a non-transitory computer-readable medium that causes a computer to perform an area information estimating method comprising:
acquiring an image from a camera photographing a sensing area;
detecting a person from the image of the camera;
calculating an existence position of the person in the sensing area based on a coordinate on the image in which the person is detected by the person detection step; and
estimating an existence allowable area where a person can exist in the sensing area based on a distribution of the existence position of the person detected in a predetermined period in the sensing area,
wherein the person in whom a relationship between the coordinate and a size on the image does not satisfy a predetermined condition is excluded from a detection target in the person detection step, wherein the estimating step comprises superposing each detected existence position on plan view in a form of a probability density distribution, and determining an area where a cumulative probability becomes greater than or equal to a predetermined level as the existence allowable area, and wherein the area information estimating method is used to perform air conditioning control by an air conditioner based on information estimated by the area information estimating method.

* * * * *